United States Patent [19]

Murakita et al.

[11] 4,179,495

[45] Dec. 18, 1979

[54] METHOD FOR REMOVING AS, OR AS AND SB AND/OR BI FROM SULFURIC ACID

[75] Inventors: Seiichi Murakita; Akio Ohta; Satoshi Narahara, all of Niihama, Japan

[73] Assignee: Sumitomo Metal Mining Company Limited, Tokyo, Japan

[21] Appl. No.: 935,860

[22] Filed: Aug. 22, 1978

[30] Foreign Application Priority Data

Aug. 25, 1977 [JP] Japan ................................ 52/102380

[51] Int. Cl.$^2$ .......................... C01B 17/90; C25C 1/12
[52] U.S. Cl. ........................................ 423/531; 423/87;
204/106; 204/108; 204/DIG. 13
[58] Field of Search ................. 423/531, 522, 87, 617;
204/104, 106, 108, DIG. 13

[56] References Cited

U.S. PATENT DOCUMENTS

| 3,753,877 | 8/1973 | Lindstrom | 204/108 |
| 3,755,111 | 8/1973 | Lindstrom | 204/108 |

FOREIGN PATENT DOCUMENTS

| 29288 | 9/1930 | Australia | 204/DIG. 13 |
| 119755 | 3/1945 | Australia | 204/DIG. 13 |
| 119835 | 4/1945 | Australia | 204/DIG. 13 |
| 5523 | of 1882 | United Kingdom | 423/87 |
| 259384 | 5/1975 | U.S.S.R. | 204/DIG. 13 |
| 471301 | 9/1975 | U.S.S.R. | 423/87 |

*Primary Examiner*—O. R. Vertiz
*Assistant Examiner*—Gary P. Straub
*Attorney, Agent, or Firm*—Watson, Cole, Grindle & Watson

[57] ABSTRACT

A method for removing As, or As and Sb and/or Bi wherein acidic solution of sulfuric acid such as a copper electrolyte of having a free sulfuric acid concentration of less than 700g./l. and containing at least arsenic among arsenic, antimony and bismuth as impurities is warmed to be above 50° C. or preferably above 60° C. with the addition of $H_3AsO_4$ in advance as required, one or a mixture of both of $Sb_2O_3$ and $Bi_2O_3$ preferably kneaded with water or the added solution is added to and mixed with the solution and the produced precipitate is separated to discharge the impurities out of the solution.

44 Claims, No Drawings

METHOD FOR REMOVING AS, OR AS AND SB AND/OR BI FROM SULFURIC ACID

BACKGROUND OF THE INVENTION

1. Field of the Invention

This invention relates to a method for removing As, or As and Sb and/or Bi from an acidic solution of sulfuric acid so as to separate impurities from acidic solution of sulfuric acid such as a copper electrolyte containing at least arsenic among arsenic, antimony and bismuth as impurities.

2. Description of the Prior Art

In refining a nonferrous metal, particularly in electrolytically refining copper, impurities contained in a crude copper plate such as nickel, arsenic, antimony and bismuth will dissolve out into the electrolyte. When their concentration is above a limit, the quality of the electrolytic copper will be reduced. Therefore, a purification step for removing such impurities from the electrolyte is necessary.

In a conventional purification step for electrolytically refining copper, arsenic, antimony and bismuth have been removed by a copper liberating electrolytic method wherein such components are electrolytically collected as a slime together with copper in the solution by using an insoluble anode. (A. Butts: Copper, The Science and Technology of the Metal, Its Alloys and Compounds, 1954, pp. 204–211)

However, in such a method, as the above mentioned impurities are removed together with copper, copper liberated from the solution will necessarily be contained in the slime and it will be necessary to retreat the slime in the prestep of smelting copper. Thus this method is not satisfactory as a method of discharging the above mentioned impurities out of the system.

If a neutralizing method wherein sodium carbonate or the like is added into the solution is used, the consumption of free sulfuric acid and the contamination of heterogeneous metallic ions (such as $Na^{++}$ and $Ca^{++}$) into the solution will increase. Thus it is not an appropriate method of purifying the copper electrolyte.

Furthermore, use of an analytic chemical method has been considered wherein hydrogen sulfide is blown into the solution to precipitate arsenic and other impurities as sulfides.

In such a case, copper will coprecipitate and will be contained in the precipitate. Therefore, it is necessary to work such purification method while taking the balance of the copper concentration and sulfuric acid concentration in the electrolyte into consideration.

SUMMARY OF THE INVENTION

An object of the present invention is to provide an entirely novel and advantageous method of removing As, or As and Sb and/or Bi from an acidic solution of sulfuric acid wherein arsenic, antimony and bismuth can be precipitated without influencing the concentrations of other components such as copper ions and free sulfuric acid. Therefore the obtained precipitate does not contain heavy metals such as copper and the above mentioned impurity elements can be effectively taken out of the system without requiring to repeat it in the prestep of the smelting.

In order to attain this object, according to the present invention, an acidic solution of sulfuric acid such as a copper electrolyte of a free sulfuric acid concentration of less than 700 g./l. containing at least arsenic among arsenic, antimony and bismuth as impurities is warmed to be above 50° C., one or a mixture of both of $Sb_2O_3$ and $Bi_2O_3$ is added to and mixed with the solution and the produced precipitate is separated to remove the above mentioned impurities.

DETAILED DESCRIPTION OF THE INVENTION

The inventors have reached the present invention by discovering a novel fact that when one or a mixture of both of $Sb_2O_3$ and $Bi_2O_3$ is added to and mixed with a copper electrolyte, such additives will once dissolve out into the solution and will then produce a white precipitate together with arsenic, antimony and bismuth in the solution and the concentration of these components in said solution will quickly be reduced.

The higher the temperature of the solution, the higher the reaction velocity of this precipitate producing reaction. Generally, at about 50° C., the production of the precipitate will be realized but the velocity will be low. Above 60° C., the progress of the reaction will be remarkable. Further, the larger the amounts of added $Sb_2O_3$ and $Bi_2O_3$, the higher the reaction velocity and the larger the amounts of the removed impurities. However, in the case of $Sb_2O_3$, if the solution temperature is 90° and 60° C., respectively with the addition of more than 3 and 5 g./l., effects remarkable enough will be obtained. In the case of $Bi_2O_3$, if the solution temperature is 90° and 60° C., respectively with the addition of more than 3 and 10 g./l., the effects will be remarkable.

As the additive, beside pure $Sb_2O_3$ and $Bi_2O_3$ and a mixture of both, there can be effectively used, for example, $Sb_2O_3$ containing some of impurity such as antimony oxide recovered from a fuming furnace in a step of treating an anode slime obtained in a electrolytically refining copper.

In adding $Sb_2O_3$ and $Bi_2O_3$, they may be added in the form of powders but, if they are kneaded in advance with water of the added solution and are then added, the contact with the added solution will be made particularly effectively quickly made.

In the method of the present invention, not only a copper electrolyte but also an acidic solution of sulfuric acid containing arsenic or the like can be applied. However, if the free sulfuric acid concentration in the solution becomes higher, the residual concentration of an added component such as antimony after the production of the precipitate will become higher, arsenic and such component which is not added as bismuth or antimony will be removed but, as a result, the concentration of the added component will tend to rise. When the free sulfuric acid concentration exceeds 700 g./l., though depending on the amount of the added $Sb_2O_3$ or the like and the arsenic concentration in the solution, the total concentration of arsenic, antimony and bismuth in the solution before $Sb_2O_3$ or the like is added and the total concentration of them in the solution when 6 hours have elapsed after the addition will be substantially equal to each other. Further, when the free sulfuric acid concentration reaches 900 g./l., the added $Sb_2O_3$ or the like will dissolve but will not cause a reaction of producing a precipitate. Therefore, it is necessary that the solution to which the method of the present invention can be applied should be of a free sulfuric acid concentration of less than 700 g./l.

When the concentration of arsenic in the solution is less than about 3 g./l., though depending on the solution temperature and the amounts of added $Sb_2O_3$ and $Bi_2O_3$, the reaction velocity will be reduced such that it will not be desirable in practice. In such case, if the concentration of arsenic in the solution is elevated in advance by method such as adding arsenic acid ($H_3AsO_4$) to said solution and then the already described method is used, the reaction will be able to be effectively accelerated and the object will be able to be attained.

If one or a mixture of both of $Sb_2O_3$ and $Bi_2O_3$ is added to and mixed with a copper electrolyte or the like by such method as is described above, these additives will once dissolve out into the solution and the concentration of antimony and/or bismuth in the solution will once rise with it but then a white precipitate will be produced and the concentrations of arsenic, antimony and bismuth in the solution will reduce all at once. The thus obtained white precipitate will be coarse in granularity, will be very high in sedimentability and filtrability and will be able to be easily separated.

According to the method of the present invention, arsenic, antimony and bismuth can be precipitated and removed without influencing the concentrations of other components such as, for example, copper ions and free sulfuric acid in the solution and therefore the obtained white precipitate does not contain copper or the like and can be all taken out of the system. Examples of analysis values of such white precipitate are shown in Table 1.

Table 1

| Component | As | Sb | Bi |
|---|---|---|---|
| Weight in % | 19.4 | 51.7 | 3.3 |

By treating the separated white precipitate by known method such as, for example, a method wherein arsenic is selectively extracted with a dilute alkali solution, the residue is reduced and melted and then antimony is volatilized and separated to be recovered as $Sb_2O_3$, arsenic, antimony and bismuth can be fractionally recovered. The thus recovered $Sb_2O_3$ can be repeatedly used as an additive in the process of the present invention.

However, in the method of the present invention, in case the form of arsenic in the solution is only trivalent, the progress of the reaction will be considerably obstructed but, in the case of the copper electrolyte, the arsenic in the solution will be present mostly in the pentavalent form. Therefore, it is particularly effective to apply the method of the present invention to purify a copper electrolyte.

Examples of the present invention shall be concretely explained in the following:

EXAMPLE 1

1 liter of an electrolyte (50 g./l. of $Cu^{++}$, 10 g./l. of $Ni^{++}$ and 190 to 210 g./l. of free sulfuric acid) in a step of copper electrolytic refining was taken into a flask. Powdery $Sb_2O_3$ was added into the electrolyte while it was being warmed and stirred in a water bath with a magnetic stirrer. The variations with the lapse of time of the concentrations of arsenic, antimony and bismuth in the solution with the production of a precipitate were measured under the conditions of warming temperature and the amount of added $Sb_2O_3$. The results are shown in Table 2.

From Table 2, the concentration of antimony in the solution rose once the added $Sb_2O_3$ dissolved but began to be reduced after the lapse of some time and, at the same time, the concentrations of arsenic and bismuth were also reduced. In this case, when the solution temperature was 50° C. and the amount of added $Sb_2O_3$ was 10 g./l., the concentrations of arsenic and bismuth were recognized to reduce scarcely when 6 hours elapsed but the concentration of antimony did not reduce. When the solution temperature was 60° C., with an amount of addition of 5 g./l., after 6 hours elapsed, the concentrations of both antimony and bismuth were greatly reduced to be lower than their concentrations in the initial solution. The object of removing these components was effectively attained. With an addition of 10 g./l., it was attained in a shorter time. At a solution temperature of 90° C., even with an amount of addition of 3 g./l., after 4 hours, the concentrations of arsenic, antimony and bismuth were reduced lower than in the initial solution. It is shown that, if the temperature is higher, even a small amount of added $Sb_2O_3$ will be effective.

In each case, no variation of the concentrations of copper, free sulfuric acid and nickel was recognized between the initial solution and the solution after the progress of the reaction.

Table 2

| Solution temperature | 50° C. | | | 60° C. | | | | | |
|---|---|---|---|---|---|---|---|---|---|
| Amount of added $Sb_2O_3$ | 10g./l. | | | 3g./l. | | | 5g./l. | | |
| Composition in the solution | As | Sb | Bi | As | Sb | Bi | As | Sb | Bi |
| Initial solution (g./l.) | 7.9 | 0.50 | 0.74 | 7.4 | 0.53 | 0.64 | 7.6 | 0.60 | 0.91 |
| After 1 hour | " | 1.07 | 0.71 | 7.1 | 1.28 | 0.61 | 7.5 | 1.30 | 0.76 |
| After 2 hours | " | 1.07 | 0.68 | " | 1.52 | 0.58 | 7.4 | 1.46 | 0.68 |
| After 3 hours | " | 1.08 | 0.68 | " | 1.56 | 0.56 | 7.2 | 1.51 | 0.62 |
| After 4 hours | " | 1.11 | 0.68 | 6.9 | 1.52 | 0.55 | 7.1 | 1.53 | 0.58 |
| After 5 hours | " | 1.07 | 0.69 | " | 1.52 | 0.52 | 7.1 | 1.36 | 0.58 |
| After 6 hours | 7.7 | 1.00 | 0.66 | 6.8 | 1.39 | " | 5.7 | 0.34 | 0.21 |

| Solution temperature | 60° C. | | | 90° C. | | | | | | | | |
|---|---|---|---|---|---|---|---|---|---|---|---|---|
| Amount of added $Sb_2O_3$ | 10g./l. | | | 3g./l. | | | 5g./l. | | | 10g./l. | | |
| Composition in the | As | Sb | Bi | As | Sb | Bi | As | Sb | Bi | As | Sb | Bi |

Table 2-continued

| solution | | | | | | | | | | | |
|---|---|---|---|---|---|---|---|---|---|---|---|
| Initial solution (g./l.) | 7.4 | 0.53 | 0.64 | 7.7 | 0.60 | 0.91 | 7.7 | 0.60 | 0.91 | 7.6 | 0.60 | 0.90 |
| After 1 hour | 6.9 | 1.47 | 0.58 | 7.2 | 1.90 | 0.81 | 7.0 | 1.90 | 0.66 | 7.0 | 2.13 | 0.69 |
| After 2 hours | " | 1.56 | 0.55 | 7.1 | 1.95 | 0.77 | 6.8 | 1.82 | 0.64 | 6.8 | 2.22 | 0.63 |
| After 3 hours | " | 1.61 | 0.53 | 6.8 | 1.95 | 0.59 | 6.0 | 0.65 | 0.31 | 5.4 | 0.56 | 0.11 |
| After 4 hours | 5.0 | 0.45 | 0.16 | 6.7 | 0.53 | 0.38 | 5.7 | 0.39 | 0.29 | 4.9 | 0.37 | 0.05 |
| After 5 hours | 5.0 | 0.40 | 0.13 | 6.6 | 0.44 | 0.34 | 5.6 | 0.34 | 0.21 | " | 0.33 | " |
| After 6 hours | 4.9 | 0.33 | 0.12 | 6.3 | 0.40 | 0.32 | " | 0.33 | " | 4.8 | " | " |

EXAMPLE 2

The results of tests made by adding powdery $Bi_2O_3$ to copper electrolyte by using the same method as in Example 1 are shown in Table 3.

Table 3

| Solution temperature | 50° C. | | | 60° C. | | | | | |
|---|---|---|---|---|---|---|---|---|---|
| Amount of added $Bi_2O_3$ | 10g./l. | | | 3g./l. | | | 5g./l. | | |
| Composition in the solution | As | Sb | Bi | As | Sb | Bi | As | Sb | Bi |
| Initial solution (g./l.) | 6.9 | 0.51 | 0.62 | 7.5 | 0.52 | 0.63 | 7.5 | 0.52 | 0.62 |
| After 1 hour | 6.4 | 0.21 | 7.40 | 7.4 | " | 3.30 | 7.3 | 0.50 | 5.08 |
| After 2 hours | 5.1 | 0.09 | 3.32 | 7.3 | 0.51 | " | " | 0.48 | 4.98 |
| After 3 hours | " | 0.08 | 2.42 | " | " | " | " | 0.47 | " |
| After 4 hours | 4.8 | " | 1.69 | " | " | " | " | 0.44 | " |
| After 5 hours | " | 0.07 | 1.20 | " | " | " | 7.2 | 0.41 | 4.80 |
| After 6 hours | " | " | 0.92 | " | " | " | " | 0.39 | 4.64 |

| Solution temperature | 60° C. | | | | | | 90° C. | | | | | |
|---|---|---|---|---|---|---|---|---|---|---|---|---|
| Amount of added $Sb_2O_3$ | 10g./l. | | | 3g./l. | | | 5g./l. | | | 10g./l. | | |
| Composition in the solution | As | Sb | Bi | As | Sb | Bi | As | Sb | Bi | As | Sb | Bi |
| Initial solution (g./l.) | 7.5 | 0.52 | 0.62 | 6.9 | 0.51 | 0.62 | 6.9 | 0.51 | 0.62 | 7.5 | 0.50 | 0.72 |
| After 1 hour | 5.4 | 0.09 | 3.20 | " | 0.34 | 2.05 | 6.0 | 0.23 | 1.27 | 5.7 | 0.06 | 1.22 |
| After 2 hours | 5.0 | 0.08 | 1.52 | " | 0.30 | 1.57 | " | 0.18 | 0.91 | 4.9 | " | 0.59 |
| After 3 hours | " | 0.07 | 1.20 | 6.7 | 0.27 | 1.42 | " | 0.13 | 0.77 | 4.8 | " | 0.41 |
| After 4 hours | 4.8 | " | 1.01 | " | 0.25 | 1.12 | " | 0.12 | 0.70 | " | " | 0.39 |
| After 5 hours | " | " | 0.79 | 6.4 | 0.23 | 0.71 | " | " | 0.51 | " | " | " |
| After 6 hours | " | " | 0.52 | " | " | 0.56 | " | " | 0.46 | " | " | " |

In the case of adding $Bi_2O_3$, even at a solution temperature of 50° C. and with an addition amount of 10 g./l., the concentrations of arsenic and antimony effectively reduced. But, the concentration of bismuth did not reduce to the concentration in the initial solution after 6 hours. Even at a solution temperature of 60° C., with an addition amount of 3 or 5 g./l., the reaction was slow but, with an addition of 10 g./l., the concentrations of arsenic, antimony and bismuth were reduced particularly effectively. When the solution temperature was raised to 90° C., even with an addition amount of 3 g./l., the reaction progressed effectively on arsenic and antimony and the concentration of bismuth was reduced below the concentration in the initial solution after 6 hours. With an addition amount of 5 g./l., the concentrations of arsenic, antimony and bismuth were reduced below their concentrations in the initial solution within 5 hours. With an addition amount of 10 g./l., the reaction velocity became higher and arsenic, antimony and bismuth were removed in 2 hours.

Furthermore, in each case, the concentrations of copper, free sulfuric acid and nickel were not recognized to vary between the initial solution and the solution after the progress of the reaction.

EXAMPLE 3

The test results where a mixture of $Sb_2O_3$ and $Bi_2O_3$ was added to a copper electrolyte by using the same method as in Example 1 and where antimony oxide (87.1% by weight $Sb_2O_3$, 6.4% by weight As, 3.5% by weight Pb, the rest being others) recovered in an antimony fuming furnace in an anode slime treating step in copper electrolytic refining was added are shown in Table 4.

In each case, the temperature of the solution was 90° C., the additive was powdery and the amount of the addition was 10 g./l.

Table 4

| Kind of Additive | Mixture (90% by weight $Sb_2O_3$ and 10% by weight $Bi_2O_3$) | | | Mixture (80% by weight $Bi_2O_3$ and 20% by weight $Sb_2O_3$) | | | Recovered antimony oxide | | |
|---|---|---|---|---|---|---|---|---|---|
| Composition in the solution | As | Sb | Bi | As | Sb | Bi | As | Sb | Bi |
| Initial solution in g./l. | 8.4 | 0.57 | 0.77 | 8.0 | 0.57 | 0.77 | 8.0 | 0.50 | 0.76 |
| After 1 hour | 7.4 | 2.10 | 1.00 | 7.0 | 0.88 | 4.84 | 7.3 | 1.95 | 0.50 |
| After 2 hours | 7.3 | 2.39 | 0.93 | 6.4 | 0.59 | 3.26 | 4.8 | 0.35 | 0.11 |
| After 3 hours | 4.7 | 0.73 | 0.39 | 6.3 | 0.47 | 2.56 | 4.6 | 0.30 | 0.10 |
| After 4 hours | 3.7 | 0.42 | 0.29 | 6.0 | 0.38 | 1.80 | " | 0.29 | 0.09 |
| After 5 hours | 3.6 | " | " | 5.8 | 0.34 | 1.30 | " | " | " |
| After 6 hours | " | " | " | 5.6 | 0.33 | 0.75 | " | " | " |

It is shown that the mixture of $Sb_2O_3$ and $Bi_2O_3$ was also as effective to remove arsenic, antimony and bismuth from the solution as was the individual addition of each of them. Further, it is shown that the recovered antimony oxide contained a considerable amount of other components than $Sb_2O_3$ as impurities but that, in case it was used, the reaction velocity was so high as to be effective enough.

As in Examples 1 and 2 the concentrations of copper, nickel and free sulfuric acid in the solution were not recognized to vary.

EXAMPLE 4

$Sb_2O_3$ was added to a copper electrolyte by using the same method as in Example 1. In this case, powdery $Sb_2O_3$ was kneaded in advance with water or the copper electrolyte and was then added. The results are shown in Table 5 as compared with the data of the case that $Sb_2O_3$ was added in powdery form in Example 1.

In each case, the amount of the addition was 10 g./l., and the solution temperature was 90° C.

Table 5

| Adding manner | Added as kneaded with water | | | Added as kneaded with the solution | | | Added as powdery | | |
|---|---|---|---|---|---|---|---|---|---|
| Composition in the solution | As | Sb | Bi | As | Sb | Bi | As | Sb | Bi |
| Initial solution in g./l. | 7.4 | 0.50 | 0.72 | 8.0 | 0.50 | 0.74 | 7.6 | 0.60 | 0.90 |
| After 1 hour | 6.3 | 1.66 | 0.35 | 7.0 | 1.80 | 0.41 | 7.0 | 2.13 | 0.69 |
| After 2 hours | 2.9 | 0.45 | 0.09 | 3.4 | 0.35 | 0.08 | 6.8 | 2.22 | 0.63 |
| After 3 hours | 2.8 | 0.35 | " | 3.0 | " | 0.08 | 5.4 | 0.56 | 0.11 |
| After 4 hours | 2.7 | 0.31 | " | 2.9 | " | 0.07 | 4.9 | 0.37 | 0.05 |
| After 5 hours | 2.7 | 0.30 | " | 2.8 | " | " | " | 0.33 | " |
| After 6 hours | 2.6 | " | " | " | " | " | 4.8 | " | " |

From these results, it is found that, in the case of adding $Sb_2O_3$ or the like, it may be added as a powdery form but that, if it is added as kneaded with water or the solution, the reaction velocity will be able to be elevated particularly effectively.

EXAMPLE 5

Four kinds of acidic solutions of sulfuric acid in which the concentration of free sulfuric acid was 200 g./l., the concentration of bismuth was 0.55 g./l. and the concentration of arsenic was respectively 0.8, 2.9, 5.0 and 7.3 g./l. were prepared by adding sulfuric acid, arsenic acid ($H_3AsO_4$) and $Bi_2O_3$ to distilled water.

The results of tests made by adding powdery $Sb_2O_3$ to these solution in the same method as in Example 1 are shown in Table 6. In case, the solution temperature was 90° C. and the amount of the addition was 10 g./l.

Table 6

| Composition | Solution (1) | | | Solution (2) | | | Solution (3) | | | Solution (4) | | |
|---|---|---|---|---|---|---|---|---|---|---|---|---|
| | As | Sb | Bi | As | Sb | Bi | As | Sb | Bi | As | Sb | Bi |
| Initial solution in g./l. | 0.8 | — | 0.55 | 2.9 | — | 0.55 | 5.0 | — | 0.55 | 7.3 | — | 0.55 |
| After 1 hour | 0.77 | 0.38 | 2.6 | 1.10 | 0.35 | 4.1 | 1.03 | 0.30 | 5.9 | 0.97 | 0.20 | |
| After 2 hours | " | 0.74 | 0.37 | 2.5 | 1.34 | 0.29 | 4.0 | " | 0.21 | 4.8 | 0.13 | 0.02 |
| After 3 hours | " | " | 0.36 | 2.3 | 1.35 | 0.13 | 3.8 | " | 0.18 | " | 0.10 | " |
| After 4 hours | " | 0.71 | " | " | 1.40 | " | 3.6 | 1.00 | 0.15 | 4.7 | " | " |
| After 5 hours | " | " | " | " | 1.20 | " | 3.5 | 1.07 | 0.14 | 4.3 | 0.09 | " |
| After 6 hours | " | 0.70 | " | 1.7 | 0.80 | " | 2.7 | 0.33 | 0.05 | " | " | " |

In solutions (3) and (4) which were high in arsenic concentration, arsenic and bismuth could be effectively removed. In this case, as no antimony was contained in the initial solution, the antimony concentration naturally became higher than in the initial solution but the concentrations of arsenic and bismuth were reduced greater than it. Even in the case of the solution (2) in which the arsenic concentration was 2.9 g./l., arsenic and bismuth were considerably removed but the residual concentration of antimony was rather high. In the solution (1) in which the arsenic concentration was 0.8 g./l., the bismuth concentration was rather reduced but the reaction did not substantially progress.

That is to say, it is found by this example that, in the method of the present invention, the higher the arsenic concentration in the solution, the quicker and more effective the reaction. Consequently, it is indispensable to the constitution of the present invention that the treating solution contain arsenic.

EXAMPLE 6

Five kinds of solutions in which the arsenic concentration was 7 g./l., the bismuth concentration was about 0.7 g./l. and the free sulfuric acid concentration was respectively 400, 500, 600, 700 and 900 g./l. were prepared by adding sulfuric acid, arsenic acid ($H_3AsO_4$) and $Bi_2O_3$ to distilled water and three kinds of solutions in which the arsenic concentration was about 7 g./l., the free sulfuric acid concentration was respectively 30, 80 and 130 g./l. and the bismuth concentration was elevated to the dissolvable limit of $Bi_2O_3$ were prepared in the same manner.

Powdery $Sb_2O_3$ as kneaded with the added solution was added to these solutions in the same manner as in Example 4. The results are shown in Table 7.

In each case, the amount of the addition was 10 g./l. and the solution temperature was 90° C.

When the sulfuric acid concentration was below 80 g./l., the solubility of bismuth and antimony became lower and therefore the concentrations of these components in the soution became so low that bismuth was not substantially contained at a sulfuric acid concentration of 30 g./l. but, even in such case, arsenic could be effectively removed by adding $Sb_2O_3$.

Further, when the sulfuric acid concentration became higher, the residual antimony concentration in 6 hours after $Sb_2O_3$ was added became higher and when the sulfuric acid concentration became 700 g./l., the total concentration of arsenic and bismuth before the addition of $Sb_2O_3$ and the total concentration of arsenic, antimony and bismuth in 6 hours after the addition of $Sb_2O_3$ became substantially equal to each other. Further, when the sulfuric acid concentration became 900 g./l., with the addition of $Sb_2O_3$, the concentration of antimony in the solution rose but the reaction of producing a precipitate no longer occurred.

If the present invention is utilized, the present invention has a utility value as a more advantageous method for purifying copper electrolytes than ever, because it is necessary for the purifying of copper electrolyte to reduce the concentration of impurities, but not to remove sufficiently the impurities.

Table 7

| Sulfuric acid concentration | 30g./l. | | | 80g./l. | | | 130g./l. | | | 400g./l. | | |
|---|---|---|---|---|---|---|---|---|---|---|---|---|
| Composition of impurities | As | Sb | Bi | As | Sb | Bi | As | Sb | Bi | As | Sb | Bi |
| Initial solution in g./l. | 6.6 | — | Tr | 6.8 | — | 0.01 | 7.1 | — | 0.54 | 6.9 | — | 0.71 |
| After 1 hour | 1.8 | 0.02 | " | 2.1 | 0.07 | " | 3.5 | 0.10 | 0.04 | 3.1 | 0.68 | 0.17 |
| After 2 hours | " | " | " | 2.0 | 0.06 | " | 2.8 | 0.10 | " | 3.1 | 0.58 | 0.14 |
| After 3 hours | " | " | " | " | 0.05 | " | 2.8 | 0.10 | " | 2.8 | 0.45 | 0.14 |
| After 4 hours | " | " | " | " | " | " | 2.6 | 0.09 | " | 2.7 | 0.37 | 0.13 |
| After 5 hours | " | " | " | " | " | " | 2.4 | " | " | " | 0.34 | " |
| After 6 hours | " | " | " | 1.9 | 0.04 | " | " | " | " | " | " | " |
| Sulfuric acid concentration | 500g./l. | | | 600g./l. | | | 700g./l. | | | 900g./l. | | |
| Composition of impurities | As | Sb | Bi | As | Sb | Bi | As | Sb | Bi | As | Sb | Bi |
| Initial solution in g./l. | 7.1 | — | 0.70 | 7.1 | — | 0.70 | 7.2 | — | 0.68 | 7.2 | — | 0.70 |
| After 1 hour | 3.5 | 1.48 | 0.31 | 5.2 | 1.94 | 0.45 | 6.8 | 4.46 | 0.65 | 7.2 | 9.0 | 0.70 |
| After 2 hours | 3.3 | 1.18 | 0.27 | 4.7 | 1.68 | 0.40 | 5.8 | 3.68 | 0.54 | " | " | " |
| After 3 hours | 3.1 | 1.02 | 0.26 | 4.4 | 1.58 | 0.38 | 5.2 | 3.58 | 0.51 | " | " | " |
| After 4 hours | " | " | " | 4.2 | " | 0.37 | 4.8 | 3.40 | 0.48 | " | " | " |
| After 5 hours | " | 0.98 | 0.25 | 4.0 | "0.36 | 4.6 | 3.10 | 0.46 | " | " | " | " |
| After 6 hours | 2.9 | 0.79 | " | 3.9 | 1.56 | 0.35 | 4.4 | 3.02 | 0.44 | " | " | " |

What we claim is:

1. A method for reducing the concentration of As in acidic solutions of sulfuric acid comprising providing an acidic solution of sulfuric acid having a free sulfuric acid concentration of less than 700 g./l. and containing arsenic as an impurity, warming the acidic solution to about 50° C., adding the mixing to the solution an additive selected from the group consisting of $Sb_2O_3$, $Bi_2O_3$ and mixtures thereof, allowing the solution to react with the additive for a time sufficient to cause some of the arsenic impurity to precipitate so that the concentration of arsenic in the solution is less than the initial concentration of arsenic in the solution, and separating the produced precipitate from the solution.

2. The method according to claim 1 wherein said solution is warmed above 60° C.

3. The method according to claim 1 wherein at least 3 g./l. of $Sb_2O_3$ is added to said solution and the solution temperature is at least 90° C.

4. The method according to claim 1 wherein at least 10 g./l. of $Sb_2O_3$ is added to said solution and the solution temperature is at least 60° C.

5. The method according to claim 1 wherein at least 3 g./l. of $Bi_2O_3$ is added to said solution and the solution temperature is at least 90° C.

6. The method according to claim 1 wherein at least 10 g./l. of $Bi_2O_3$ is added to said solution and the solution temperature is at least 60° C.

7. The method according to claim 1 wherein the additive is $Sb_2O_3$ which includes some impurities such as antimony oxide recovered from a fuming furnace.

8. The method according to claim 1 wherein said additive is added in a powdery form.

9. The method according to claim 1 wherein said additive is kneaded in advance with water or an added solution and is then added to the solution.

10. The method according to claim 1 wherein said acidic solution of sulfuric acid is a copper electrolyte.

11. The method according to claim 1 wherein if the arsenic concentration in the initial solution is less than 3 g./l., $H_3AsO_3$ is added to said solution prior to the addition of the additive.

12. A method for reducing the concentration of As and Sb in acidic solutions of sulfuric acid comprising providing an acidic solution of sulfuric acid having a free sulfuric acid concentration of less than 700 g./l. and containing arsenic acid antimony as impurities, warming the acidic solution to above 50° C., adding the mixing to the solution an additive selected from the group consisting of $Sb_2O_3$, $Bi_2O_3$ and mixtures thereof, allowing the solution to react with the additive for a time sufficient to cause some of each of the contained impurities to precipitate so that the concentration of arsenic and antimony in the solution is less than the initial concentration of arsenic and antimony in the solution, and separating the produced precipitate from the solution.

13. The method according to claim 12 wherein said solution is warmed above 60° C.

14. The method according to claim 12 wherein at least 3 g./l. of $Sb_2O_3$ is added to said solution and the solution temperature is at least 90° C.

15. The method according to claim 12 wherein at least 10 g./l. of $Sb_2O_3$ is added to said solution and the solution temperature is at least 60° C.

16. The method according to claim 12 wherein at least 3 g./l. of $Bi_2O_3$ is added to said solution and the solution temperature is at least 90° C.

17. The method according to claim 12 wherein at least 10 g./l. of $Bi_2O_3$ is added to said solution and the solution temperature is at least 60° C.

18. The method according to claim 12 wherein the additive is $Sb_2O_3$ which includes some impurities such as antimony oxide recovered from a fuming furnace.

19. The method according to claim 12 wherein said additive is added in a powdery form.

20. The method according to claim 12 wherein said additive is kneaded in advance with water or an added solution and is then added to the solution.

21. The method according to claim 12 wherein said acidic solution of sulfuric acid is a copper electrolyte.

22. The method according to claim 12 wherein, if the arsenic concentration in the initial solution is less than 3 g./l., $H_3AsO_4$ is added to said solution prior to the addition of the additive.

23. A method for reducing the concentration of As and Bi in acidic solutions of sulfuric acid comprising providing an acidic solution of sulfuric acid having a free sulfuric acid concentration of less than 700 g./l. and containing arsenic and bismuth as impurities, warming the acidic solution to above 50° C., adding and mixing to the solution an additive selected from the group consisting of $Sb_2O_3$, $Bi_2O_3$ and mixtures thereof, allowing the solution to react with the additive for a time sufficient to cause some of each of the contained impurities to precipitate so that the concentration of arsenic and bismuth in the solution is less than the initial concentration of arsenic and bismuth in the solution, and separating the produced precipitate from the solution.

24. The method according to claim 23 wherein said solution is warmed above 60° C.

25. The method according to claim 23 wherein at least 3 g./l. of $Sb_2O_3$ is added to said solution and the solution temperature is at least 90° C.

26. The method according to claim 23 wherein at least 10 g./l. of $Sb_2O_3$ is added to said solution and the solution temperature is at least 60° C.

27. The method according to claim 23 wherein at least 3 g./l. of $Bi_2O_3$ is added to said solution and the solution temperature is at least 90° C.

28. The method according to claim 23 wherein at least 10 g./l. of $Bi_2O_3$ is added to said solution and the solution temperature is at least 60° C.

29. The method according to claim 23 wherein the additive is $Sb_2O_3$ which includes some impurities such as antimony oxide recovered from a fuming furnace.

30. The method according to claim 23 wherein said additive is added in a powdery form.

31. The method according to claim 23 wherein said additive is kneaded in advance with water or an added solution and is then added to the solution.

32. The method according to claim 23 wherein said acidic solution of sulfuric acid is a copper electrolyte.

33. The method according to claim 23 wherein, if the arsenic concentration in the initial solution is less than 3 g./l., $H_3AsO_4$ is added to said solution prior to the addition of the additive.

34. A method for reducing the concentration of As, Sb and Bi in acidic solutions of sulfuric acid comprising providing an acidic solution of sulfuric acid having a free sulfuric acid concentration of less than 700 g./l. and containing arsenic, antimony and bismuth as impurities, warming the acidic solution to above 50° C., adding and mixing to the solution an additive selected from the group consisting of $Sb_2O_3$, $Bi_2O_3$ and mixtures thereof, allowing the solution to react with the additive for a time sufficient to cause some of each of the contained impurities to precipitate so that the concentration of arsenic, antimony and bismuth in the solution is less than the initial concentration of arsenic, antimony and bismuth in the solution, and separating the produced precipitate from the solution.

35. The method according to claim 34 wherein said solution is warmed above 60° C.

36. The method according to claim 34 wherein at least 3 g./l. of $Sb_2O_3$ is added to said solution and the solution temperature is at least 90° C.

37. The method according to claim 34 wherein at least 10 g./l. of $Sb_2O_3$ is added to said solution and the solution temperature is at least 60° C.

38. The method according to claim 34 wherein at least 3 g./l. of $Bi_2O_3$ is added to said solution and the solution temperature is at least 90° C.

39. The method according to claim 34 wherein at least 10 g./l. of $Bi_2O_3$ is added to said solution and the solution temperature is at least 60° C.

40. The method according to claim 34 wherein the additive is $Sb_2O_3$ which includes some impurities such as antimony oxide recovered from a fuming furnace.

41. The method according to claim 34 wherein said additive is added in a powdery form.

42. The method according to claim 34 wherein said additive is kneaded in advance with water or an added solution and is then added to the solution.

43. The method according to claim 34 wherein said acidic solution of sulfuric acid is a copper electrolyte.

44. The method according to claim 34 wherein, if the arsenic concentration in the initial solution is less than 3 g./l., $H_3AsO_4$ is added to said solution prior to the addition of the additive.

* * * * *